United States Patent Office 3,364,150
Patented Jan. 16, 1968

3,364,150
CATALYST AND METHOD FOR INCREASING THE HYDROCRACKING ACTIVITY THEREOF
Thomas R. Hughes, Berkeley, Calif., assignor to Chevron Research Company, a corporation of Delaware
No Drawing. Continuation of application Ser. No. 283,994, May 29, 1963, which is a continuation-in-part of application Ser. No. 803,106, Mar. 31, 1959. This application Jan. 9, 1967, Ser. No. 609,271
11 Claims. (Cl. 252—439)

ABSTRACT OF THE DISCLOSURE

Method for increasing hydrocracking activity of a siliceous hydrocracking catalyst, involving heating the catalyst with the hydrogenating component or components present in the oxide form at a temperature within the range 1200 to 1600° F. for a period in the range 0.25 to 48 hours under a reduced pressure, and the catalyst that has been so treated.

---

This case is a continuation of Ser. No. 283,994, filed May 29, 1963, and now abandoned, which is a continuation-in-part of application Ser. No. 803,106, filed Mar. 31, 1959.

INTRODUCTION

This invention relates to the provision of a novel catalyst which is useful in processes for efficiently converting hydrocarbons and hydrocarbon fractions to those of lower molecular weight. More particularly, this invention is directed to the provision of a composite catalyst incorporating an active, siliceous cracking component and a nickel or cobalt-containing hydrogenating component, said catalyst being prepared by a novel method whereby there is obtained a catalyst having an activity which is far higher than that heretofore obtained with catalysts of the same general class.

OBJECTS

It is an object of this invention to provide a new catalyst which is especially effective in the conversion of hydrocarbon distillates to valuable motor, jet, and other fuel fractions, as well as to lighter isoparaffins and aromatics, said conversion being effected under such conditions that normally gaseous hydrocarbons and coke are formed in but extremely small amounts. Another object is to provide a catalyst of this character which exhibits extremely high activity even at low temperatures and pressures, conditions which minimize the rate of coke formation and thus greatly extend the useful life of the catalyst.

RESULTS OBTAINABLE WITH CATALYST OF PRESENT INVENTION

The present invention rests on the discovery that the foregoing and other objects are attained with the provision of a novel catalyst composition formed by a critical heat treatment of a composite material incorporating an active siliceous cracking component along with a nickel and/or cobalt-containing hydrogenating component in the amounts hereinafter prescribed. It has been found that the new catalyst is especially effective in converting petroleum and other hydrocarbon fractions (such, for example, as those derived from shale, gilsonite or other natural sources) to lower boiling products in such manner that the product has an unusually high ratio of iso to normal paraffins, the catalyst also conserving a large proportion of any ring structures present in the feed as it is converted to a lower boiling product. This latter property is of great importance because of the high value placed on naphthenes and aromatics in many product applications. Moreover, these results are obtained, with high per-pass conversions and extremely small losses to coke and light gaseous products, at temperatures far lower than those which it has heretofore been possible to employ with conventional hydrocracking catalysts, and optionally at lower pressures as well. In any event, the low temperature (and pressure) operation thus made possible makes for but very small losses of catalyst activity as the reaction progresses, and while it may be necessary to gradually raise operating temperatures during the course of any given run if conversion is to be maintained at a predetermined level, nevertheless, by initiating the run at low average catalyst temperatures it is possible to extend the run length by a factor of many times over that obtained heretofore before reaching temperatures where replacement or regeneration of the catalyst is indicated.

GENERAL CHARACTERISTICS OF CATALYST

The catalyst of this invention, as noted above, is comprised of a siliceous component having high activity as a cracking catalyst, together with one or more components having activity as hydrogenation (i.e., hydrogenation-dehydrogenation) catalysts and selected from the group consisting of the oxides and sulfides of cobalt and nickel and the hydrogen-reduced counterparts of said oxides, nickel sulfide being preferred. When a nickel-containing member of said group is employed as the hydrogenating component of the catalyst the finished catalyst should contain from about 0.5 to 30% by weight of nickel, while with cobalt, the range is from about 3 to 30%. The catalyst, as prepared under optimum heat treating conditions, has an Activity Index, as that term is hereinafter defined, of at least 18, and preferably of 20 or more. These values are at least 4 numbers higher than those of catalysts having the same empirical composition and prepared in the same fashion but without the terminal heat treatment necessarily practiced to form the catalyst of this invention, even when said treatment is not effected under optimum process conditions. As will be seen hereinafter, this is equivalent to an increase of at least 50% in activity as measured by hydrocarbon conversion at 550° F.

ACTIVITY CHARACTERISTIC OF CATALYST

The aforesaid difference in Activity Index levels is highly significant and establishes the heat-treated catalyst of the present invention as having characteristics so superior to those of the catalyst not so treated as to make for a difference amounting to one of kind between the respective materials. Thus, to take a typical operation wherein an essentially nitrogen-free naphtha boiling between about 360° and 450° F., as obtained from the cracking of petroleum fractions, is passed over the catalyst along with hydrogen gas under conventional feed rate pressure and $H_2$ rate processing conditions (e.g., 1 LHSV, 1200 p.s.i.g., and 6500 s.c.f. $H_2$ per barrel of feed) it is found that a catalyst of this invention having an Activity Index of 21 gives a per-pass conversion of said feed to valuable fuel products boiling below 360° F. of 49% at an average catalyst temperature of 550° F., and this with essentially negligible losses to light gases and coke. The same catalyst without heat treating and having an Activity Index of 14 gives a per-pass conversion of but 20% under these same conditions. In terms of run length in an operation conducted under these conditions, but with average catalyst temperatures being gradually raised as required to maintain per-pass conversion at a 60% level, it is found that the catalyst having an Activity Index of 21 may be kept on stream for approximately 4100 hours before reaching a temperature of 700° F., while the catalyst of 14 Activity Index can be similarly employed for only 910 hours before reaching said temperature. The differences in conversion and run length are almost equally striking when comparing the above non-heat treated catalyst of 14 Activity Index with one of the present invention having the minimal Activity Index of 18 set forth above. Thus, the latter catalyst gives a per-pass conversion of 37% at 550° F., and affords a run length of 2100 hours at 60% per-pass conversion before reaching 700° F.

CHARACTERISTICS OF SILICEOUS COMPONENT OF CATALYST

In referring herein to the cracking component of the catalyst, the term "active siliceous cracking component" is employed to designate any synthetic or natural siliceous composition of acid character which is effective for the cracking of hydrocarbons. This siliceous component, before deposition of the hydrogenation catalyst thereon, should contain at least about 50% by weight of silica, calculated as $SiO_2$. From the activity cracking standpoint, the siliceous component of the catalyst should be one having a "Cat. A" activity of at least 25 as measured by the method of J. Alexander and H. G. Shimp, National Petroleum News (1944), vol. 36, page R–537 and of J. Alexander, Proc. Am. Petroleum Institute (1947), vol. 21, page 51. As illustrative of the cracking catalyst components which can be used, synthetic silica-alumina, silica-magnesia, silica-zirconia and silica-alumina-zirconia catalysts give good results, as do natural cracking catalysts such as the bentonite and kaolin clays, it being recognized that in some cases the acidic nature of the cracking component of the catalyst may be enhanced by the addition of halides or the practice of other known means for developing Lewis or Brönsted type of acidity in the finished catalyst composition. A preferred active siliceous cracking component for use in the catalyst of this invention is comprised of synthetically prepared composites of silica and alumina containing from about 70 to 99% of the silica component.

METHOD OF PREPARATION OF SILICEOUS CRACKING COMPONENT OF CATALYST

The method by which the catalyst of this invention is prepared involves a number of critical and inter-related factors having to do with the relative amount of the hydrogenation component employed, the temperature and time of the final heat treatment given the catalyst, and the pressure conditions under which the catalyst is treated. However, the siliceous cracking component of the catalyst can be prepared by known methods. Similarly, the cobalt or nickel components can be deposited on or composited with the siliceous component and thereafter reduced to oxide form by methods heretofore disclosed in the art. Thus, the proposed class of silica-alumina cracking components can be prepared by any one of several alternate methods. For example, an aqueous solution of an aluminum salt, suitably adjusted in acidity, may be combined with a solution of sodium silicate under such conditions that the corresponding gels are coprecipitated in intimate admixture. On the other hand, silica-gel and alumina-gel may be separately prepared and then mixed in the desired proportions. Alternatively, a formed silica-gel may be treated with an aqueous solution of an aluminum salt, and the alumina precipitated in the silica-gel by the addition of a precipitant. In another method the silica-alumina may be prepared by first forming an acid-stabilized silica sol and then adding an adsorptive alumina to raise the pH and cause the gelation of the mixture.

IMPREGNATION OF SILICEOUS CRACKING COMPONENT OF CATALYST

After preparation of the siliceous cracking component, the latter is preferably impregnated with an aqueous solution of a water-soluble salt of cobalt or nickel, the concentration of the salt in this solution and the quantity of the latter used to impregnate the catalyst being such that the desired concentration of cobalt or nickel is established on the cracking support. Representative salts which may be employed to effect said impregnation are the chlorides, nitrates and acetates of nickel or cobalt, though other heat decomposable salts may be employed if desired, including various metallo-organic compositions such as the chelates. After impregnation, the catalyst is dried and then calcined at temperatures usually of the order of 800° to 1100° F. to convert the contained metal salt in the catalyst to the corresponding oxide. Instead of following the foregoing impregnation procedure, the cobalt and/or nickel salts can be incorporated in the siliceous catalyst component as the same is being formed, in which case the composition is also dried and calcined to form the metal oxides.

PHYSICAL SIZE AND SHAPE OF CATALYST

The catalyst can be used in the form of pellets, beads, extruded or other particle shapes, whether further comminuted or not. Thus, good results have been obtained with a catalyst mass made up of small beads having an average diameter of about ⅛′, as well as with a crushed aggregate prepared from said beads. Good results are also obtained when the catalyst is ground to a fineness permitting of so-called "fluidized" operation.

HEAT TREATMENT OF CATALYST

In accordance with the method of this invention, it has been found that composite catalyst containing an active siliceous cracking component together with nickel, cobalt or the oxides or sulfides of said metals in hereinafter defined amounts, can be prepared in an unusually active form by the practice of a controlled heating step wherein the catalyst, with the cobalt or nickel present therein in the form of oxides or of compounds decomposed thereto on heating, is subjected to a so-called thermactivation step wherein the mass of particulate catalyst is treated at temperatures falling in a range of from about 1200 to 1600° F., at subatmospheric pressures below 1 millimeter of mercury absolute, and preferably below $1 \times 10^{-2}$ millimeter of mercury absolute. This treatment is continued for a period of time sufficient to induce a substantial increase in catalyst activity as measured by the ability of the catalyst to convert hydrocarbon feed fractions to product fractions boiling below the initial boiling point of the feed. While such activity, as measured in terms of volume percent of feed converted in a single pass over the catalyst will vary depending on feed composition, throughput rate and other operating factors, the relative increase in activity obtained by a practice of the present thermactivation treatment is one of at least 50% as measured at 550° F., with an essentially nitrogen-free hydrocarbon feed fraction boiling within a range of from about 330 to 650° F. In a broad sense this relative increase in catalyst activity can be obtained by the practice of heat treating periods ranging from about 10–30 minutes to 48 or more hours, it being noted that the longer times (e.g., 30 to 48 hours) are employed when treating the catalyst at temperatures in a range of from about 1200–1300° F. if the maximum benefits possible at said temperatures are to be obtained, while periods of relatively short duration (e.g., 0.25 to 2 hours) are employed at temperatures above 1500° F. and especially at those approaching 1600° F., it having been found that the catalyst reaches maximum activity in a relatively short period at these higher temperatures and thereafter tends to become deactivated when the treatment is extended beyond the time sufficient to effect full activation. In view of this difficulty, the heat treating step of this invention is preferably conducted at temperature levels below about 1550° F. in order to insure the production of a catalyst of desired activity under the somewhat variable conditions encountered in commercial operation. On the other hand, temperatures above about 1300° F. are preferably employed in order to insure the production of catalysts of relatively high activity without having to unduly extend the length of the heating interval, it being noted that long periods of this character tend to reduce the surface area of the catalyst to a disproportionate degree and thus may adversely affect catalyst activity.

FACTORS AFFECTING CATALYST ACTIVITY

In general, other conditions remaining the same, the activity of the catalyst is increased by (1) raising the temperature of the catalyst; (2) extending the length of the heat treating period, it being noted that as relatively high treating temperatures are employed, catalyst activity reaches peak activity in a relatively short period of time and thereafter declines with continued heat treatment; (3) raising the relative content of the hydrogenating component present; and (4) maintaining the partial pressure of water vapor in contact with the catalyst at as low a level as possible by operating under high vacuum.

PREPARATION OF CATALYST SUPPORT

A typical catalyst is one made up of nickel sulfide supported on a synthetically prepared silica-alumina cracking catalyst of high activity (Cat. A value of 46) containing approximately 90% $SiO_2$ and 10% $Al_2O_3$. This support may be formed by adding a solution of sodium silicate to one containing aluminum sulfate and sulfuric acid, the hydrogel so formed being converted into the shape of small beads by passage through an oil. The resultant beads are then base-exchanged with an aqueous solution of aluminum sulfate to increase the alumina content to approximately 10%, following which any sodium remaining in the beads is removed by base exchange using an aqueous solution of ammonium chloride. The alkali-free beads are slowly dried in a humid atmosphere and are then calcined at a temperature of about 1200° F. until the surface area of the product is reduced to a level of approximately 400–475 m.²/gm. Unless otherwise stated, this material is that meant in hereinafter referring to silica-alumina beads whether the same be employed whole or crushed to a smaller size.

IMPREGNATION, DRYING, HEAT TREATING AND SULFIDING OF CATALYST

The catalysts used in the practice of the invention can be prepared by impregnating the support described in the preceding paragraph with an aqueous solution of a salt such, for example, as nickel nitrate or cobalt acetate, in an amount sufficient to provide the desired weight of nickel or cobalt on the dried catalyst. The resulting impregnated product is thereafter dried, or dried and calcined, as at temperatures up to about 1100° F. However, experience shows this pre-calcining step to be unnecessary from an activation standpoint, the metal salts being suitably converted to the oxide form during the initial stages of heating the catalyst under vacuum to 1200° F. or above, as described herein. Following the thermactivation step, the metal compound present on the catalyst is preferably converted to the sulfide, as, for example, by passing over the catalyst an excess of a feed stream containing $H_2S$, dimethyl disulfide, or the like, a feature which is explored in greater detail below.

EFFECT OF CATALYST NICKEL AND COBALT CONTENT ON ACTIVITY

As regards the content of nickel or cobalt in the catalyst, it is found that activity increases with increasing metal content, said increase being particularly significant in the lower portions of the nickel and the cobalt ranges, i.e., the range of from about 0.5 to 1.5 wt. percent nickel and from about 3 to 4 wt. percent cobalt.

EFFECT OF CATALYST NICKEL AND COBALT CONTENT ON AROMATICS SATURATION

Increasing the content of cobalt or nickel on the catalyst also has the effect of increasing the tendency of the catalyst to saturate aromatics when the latter are present in the feed stock employed, and, as a general rule, it is desired to keep such aromatics-saturation at a relatively low level. A good index of the extent to which aromatics saturation occurs is afforded by measuring the aniline point of the product obtained from a given reference feed at varying nickel contents. In the general range of from about 0.5 to 6% nickel the tendency to saturate aromatics increases smoothly. However, at a point varying between about 6% and 10% nickel, the extent of aromatics saturation turns rather sharply upward. In view of this increasing tendency to saturate aromatics, the preferred catalysts of this invention contain less than about 10% by weight nickel (or 12% by weight cobalt), while minimal nickel and cobalt contents of approximately 1.5 and 4 weight percent, respectively, are preferably observed to insure the resultant production of catalysts falling in the higher portion of the desired activity range.

METHOD OF DETERMINING ACTIVITY INDEX

A. Test feed stock used

The test to determine the Activity Index of the catalyst broadly involves a determination of the conversion of a standard and readily obtainable hydrocarbon feed stock of defined physical and chemical characteristics to products falling below the boiling point of said stock under defined operating conditions. The feed stock employed is a catalytic cycle oil recovered as a distillate fraction from the effluent of a fluid type of catalytic cracking unit, the recovered fraction being one containing essentially equal proportions of aromatic and paraffinic compounds and boiling over a range of from approximately 400 to 575° F., as determined by ASTM D–158, prior to any hydrofining treatment given the feed to reduce its basic nitrogen content to a level below 5 p.p.m., this being the maximum amount permitted in the test feed. The specific test feed employed in obtaining the Activity Index values given herein was obtained from a fluid catalytic cracking unit being charged with a mixture of light and heavy gas oils cut from a Los Angeles Basin crude. This test stock was hydrofined by passing the same along with 3500 s.c.f. hydrogen per barrel of naphtha through a hydrofining catalyst containing cobalt oxide (2% cobalt) on a coprecipitated molybdena-alumina (9% molybdenum) support at a pressure of 800 p.s.i.g., an LHSV of 1, and at a temperature between 700° F. and 750° F. This hydrofining operation was accompanied by a hydrogen consumption of 300 to 400 s.c.f. hydrogen per barrel of feed and resulted in a reduction of the basic nitrogen content in the liquid effluent to less than 5 p.p.m. The hydrofined test stock had the following inspections:

TABLE I.—INSPECTIONS OF TYPICAL HYDROFINED CYCLE OIL TEST SAMPLE

| | |
|---|---|
| Gravity, ° API | 30 |
| Aniline point, ° F. | 93 |
| Nitrogen (basic), p.p.m. | Below 5 |
| Aromatics vol. percent | 48 |
| Olefins, vol. percent | 1 |
| Paraffins, vol. percent | 51 |
| ASTM distillation (D–158), percent: | |
| Start | 357 |
| 5 | 420 |
| 10 | 434 |
| 30 | 460 |
| 50 | 476 |
| 70 | 493 |
| 90 | 519 |
| 95 | 532 |
| End point | 570 |

Prior to hydrofining, the cycle oil had a gravity of 28° API, an ASTM D–158 start of about 400° F., and a basic nitrogen content of about 175 p.p.m. The reduction in ASTM start in hydrofining was due to a small amount of cracking.

B. *Test equipment used*

The equipment employed in determining the Activity Index of the catalyst is a conventional continuous feed pilot unit, operated once-through with hydrocarbon feed in vapor phase and hydrogen gas. It consists of a cylindrical reaction chamber operated downflow with a preheating section, followed by a section containing the catalyst under test, and enclosed in a temperature controlled metal block to permit isothermal operation, together with the necessary appurtenances, such as feed burettes, feed pump, hydrogen supply, condenser, high pressure separator provided with means for sampling the gas and liquid phases back pressure regulators, and thermocouples. For accuracy in hydrogen feed, hydrogen is compressed into a hydrogen accumulator or burette whence it is fed to the reactor by displacement with oil fed at constant rate from a reservoir by means of a pump.

C. *Test procedure used*

In testing a catalyst to determine its Activity Index the foregoing hydrofined cycle oil test stock, along with 8000 s.c.f. $H_2$ per barrel of feed, is passed through a mass of catalyst (65 ml. were actually employed) at a liquid hourly space velocity of 2 and at a catalyst temperature of 610° F., the actual feed rate employed being 130 ml. per hour. The run is continued for 14 hours under these conditions, with samples being collected at about two-hour intervals. These samples are allowed to flash off light hydrocarbons at ambient temperature and pressure following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation are usually regarded as representative of steady-state operating conditions and may be distilled to determine conversion to product boiling below the initial boiling point of the feed. This conversion under steady test conditions is a true measure of the activity of the catalyst. However, the API gravity rise, that is, the API gravity of the product sample or samples minus the API gravity of the feed, is a rapid and convenient method of characterizing the catalyst which correlates smoothly with conversion. For convenience the foregoing API gravity rise is referred to as the Activity Index of the catalyst.

D. *Temperature at which Activity Index test is made*

The Activity Index values employed herein are all of the 610° F. variety, said temperatures being that of the test described above. However, certain of the more active catalysts (notably those giving per-pass conversions in excess of about 70% at 610° F.) are Activity Index tested at 570° F. The gravity rise values so obtained may then be converted to 610° F. values by correlation using data obtained by testing the same catalysts at both temperatures.

E. *Activity indices of other catalytic cycle stocks*

While reference has been made above to the use of a particular catalytic cycle stock in connection with determining the Activity Index of the catalyst, it is believed that similar Activity Index values can be obtained from other than California crudes provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

PROCESSES IN WHICH CATALYST MAY BE USED

The thermactivated catalysts prepared by the method of this invention can be employed in a wide variety of hydrocarbon conversion processes, including those of modified (or low temperature) hydrocracking, hydrogenation-dehydrogenation, isomerization, polymerization and alkylation.

EFFECT OF USING CATALYST IN OXIDE OR SULFIDE FORM

Moreover, said catalysts can be employed in the oxide form existing at the conclusion of the thermactivation step or in the form obtained by reducing the metal oxides either prior to using the catalyst or as an incident of placing the unit on stream with a hydrogen-containing feed stream. Preferably, however, the nickel and/or cobalt present on the catalyst are converted to the sulfide form before the catalyst is used in the desired hydrocarbon conversion operation, this being particularly true with processes of the type generally referred to above and described more particularly hereinafter wherein hydrocarbon feed stocks are converted at low temperatures to lower boiling products having excellent fuel characteristics, said conversion being effected with essentially nominal losses to coke and light gases of little economic value. When an attempt is made to effect said conversion operation by using a thermactivated catalyst wherein a nickel or cobalt is present in the oxide or reduced oxide (metal) form, it is found that such catalysts effect a large initial saturation of aromatics present in the feed. This reaction is strongly exothermic and thus induces the formation of hot spots in the catalyst bed, a phenomenon which is accompanied by accelerated fouling of the catalyst with its resultant decrease in catalyst activity. On the other hand, catalysts which are sulfided prior to being used in this hydrocarbon conversion operation do not exhibit this undesirable tendency toward oversaturation of aromatics and thus permit the unit to be brought on-stream at high conversion levels without giving rise to any abnormally high rate of catalyst fouling. Start-up difficulties are also eliminated in large measure even when using the catalyst in the nonsulfided form provided a feed stream is used which has a high enough sulfur level to effect a rapid sulfiding of the catalyst, a method of operation which is generally the equivalent of initiating a given hydrocarbon conversion cycle with the use of the catalyst in the pre-sulfided form.

METHOD OF SULFIDING CATALYST

Sulfiding of the thermactivated catalyst can be effected by the practice of a variety of methods, it being borne in mind however, that the catalyst, whether employed in the sulfided condition or not, should be protected from contact with moisture before being used. Should the catalyst become wet or otherwise contaminated with moisture, it is necessary to subject the same to a rethermactivation treatment of the type described herein to bring its activity back to the desired level, the nickel or cobalt present being converted to the oxide form (if not already present as such) before repeating the thermactivation step.

When converting the nickel oxide and/or the cobalt oxide present on the catalyst to the sulfide condition, it usually is desirable and convenient to load the thermactivated catalyst into the reactor, purge with inert gas, shift to hydrogen flow, and adjust to the normal process "on-stream" operating temperature before starting to sulfide the reduced nickel or cobalt, as by the addition of hydrogen sulfide or the like. Temperatures above about 750° F. should not be employed when sulfiding. Hydrogen sulfide may either be fed to the reactor as such, or formed by feeding carbon disulfide, light mercaptans, or organic sulfides, disulfides or the like, either with or without the simultaneous use of a hydrocarbon stream. An equivalent procedure is to come up to temperature with an inert gas sulfide the oxide directly, and then shift to hydrogen before going on stream. In any case an atmosphere of dry hydrogen or other nonoxidizing gas should be maintained over the catalyst to remove adsorbed oxygen and water formed by conversion of the oxide to a sulfide. In no case should the catalyst be brought up to any temperature approaching 1000° F. with nickel or cobalt in the reduced or sulfided state.

SUITABLE FEEDSTOCKS AND PRODUCTS OBTAINABLE WITH USE OF CATALYST AT LOW TEMPERATURES

The catalyst of this invention, while useful in a number of hydrocarbon conversion processes, finds particular utility in operations involving the conversion of hydrocarbon fractions to lower boiling products at relatively low conditions of temperature. As a general proposition, the charging stocks employed in a conversion operation of this character, which is effected along with added hydrogen, may be any of the conventional hydrocarbon distillate fractions boiling in the range of about 100° F. to 850° F. and having a total nitrogen content below about 100 p.p.m. through hydrofining or otherwise. Suitable feeds which may be employed to provide such selected stocks are those generally defined as fractions containing $C_6$, $C_7$ and/or $C_8$ hydrocarbons, light or heavy gasolines, naphthas, kerosene distillates, light or heavy gas oils, catalytic cycle oils, and the like. These may be of straight-run origin, as obtained from petroleum, or they may be derived from various processing operations, and in particular, from thermal or catalytic cracking of stocks obtained from petroleums, gilsonite, shale, coal tar or other sources. Products, depending on the aromaticity or paraffinicity of the feed, may comprise light branched hydrocarbons such as isobutane and isopentane, high octane motor gasoline, a catalytic reformer feed of good high octane and high naphthene content, petrochemical intermediates such as xylenes, durene, etc., high quality diesel and jet fuels, low pour fuels from high pour fuels, and the like. The process conditions to be observed in carrying out this conversion operation are described in ensuing paragraphs, with a typical operation being thereafter set forth in the example.

CONDITIONS FOR TYPICAL LOW TEMPERATURE CONVERSION OPERATION

The conversion zone is operated under a pressure ranging from about 400 to 3000 p.s.i.g. or more and at average catalyst temperatures in the range of about 400° F. to 800° F., with the temperature being so regulated as to initiate the conversion reaction at a temperature below 730° F., and to maintain the average catalyst temperatures at levels below about 730° F. during at least the first half of any given conversion period (i.e., the period during which the catalyst remains on-stream before being subjected to regeneration or replacement).

EFFECT OF NITROGEN ON CONVERSION PROCESS

One of the important variables in the conduct of the conversion process which has a material effect and, to that extent, permits the production of the desired products is the control of the nitrogen content of the charge stock. As indicated, an acceptable total nitrogen level is 100 p.p.m., about 25 p.p.m. in terms of basic nitrogen, although appreciable further improvement is obtained as this basic nitrogen content is reduced to levels below 10 p.p.m. These nitrogen levels may be reached by hydrofining the feed stock by treating the same with hydrogen at elevated temperatures and pressures in the presence of a hydrogenating catalyst which has little cracking activity and little tendency to saturate aromatics under the conditions employed.

USE OF HYDROGEN IN CONVERSION PROCESS

In the operation of the conversion process, the charge stock may be introduced to the reaction zone, in admixture with hydrogen, as either a liquid, vapor or mixed liquid-vapor phase, depending upon the temperatures, pressure, proportions of hydrogen and boiling range of the charge stocks utilized. This charge stock is introduced in admixture with at least 2000 s.c.f. of hydrogen per barrel of total feed (including both fresh, as well as recycle feed), and this amount of hydrogen may range upwardly to 15,000–20,000 s.c.f. per barrel of feed. From about 1000 to 2000 s.c.f. of hydrogen is consumed in most instances in the conversion zone per barrel of total feed converted to synthetic product, i.e., that boiling below the initial boiling point of the fresh feed. The hydrogen stream admixed with incoming feed is conventionally made up of recycle gas recovered from the effluent from the conversion zone, together with fresh make-up hydrogen. The hydrogen content of the recycle stream in practice generally ranges upwardly of 75 volume percent.

LIQUID HOURLY SPACE VELOCITY OF FEED TO CONVERSION PROCESS

Generally, the conversion process feed may be introduced to the reaction zone at a liquid hourly space velocity (LHSV) of from about 0.2 to 5 volumes of hydrocarbon (calculated as liquid) per superficial volume of catalyst, with a preferred rate being from about 0.5 to 2 LHSV.

PER-PASS CONVERSIONS IN CONVERSION PROCESS

In preferred practice, the conversion is conducted at a given space rate under conditions of relatively constant conversion of at least 20% per pass, and preferably at constant conversions falling in the range of about 20% to 80% per pass. Under this type of operation, the catalyst temperature is periodically increased to maintain the per-pass conversion at relatively constant levels. Alternatively, the process may be conducted at a constant temperature of about 730° F. or lower, under which conditions the per-pass conversion will gradually decline and the on-stream portion of the processing cycle will be terminated at an arbitrary conversion level.

The following examples are presented to illustrate the practical application of the method of catalyst preparation of the invention.

*Example I*

A catalyst was prepared comprising nickel sulfide (2.5% Ni) on silica-alumina beads, containing approximately 90% by weight silica, of the type described above. Said catalyst was prepared by impregnating 15 liters of said beads with 12 liters of an aqueous solution containing 3600 grams of nickel acetate [$Ni(CH_3COO)_2 \cdot 4H_2O$] at 125° F. Following the impregnation step, the beads were drained of excess liquid and heated for 10 hours at 250° F. Following this drying step, the beads were calcined at 400° F. for two hours, at 600° F. for one hour and then at 1000° F. for 10 hours, a stream of dry air being passed over the beads at approximately 25 cu. ft./hour/cu. ft. of catalyst during these drying and calcining stages of catalyst preparation. After cooling, a portion of the air-calcined beads which now contained nickel oxide in amount equivalent to 2.5 wt. percent nickel, were set aside, and later reduced and sulfided by the method given hereinbelow to constitute the catalyst designated as Sample A in Table I.

Thereafter, another portion of the foregoing air-calcined beads was placed in a vacuum muffle and heated rapidly under a vacuum of below $1 \times 10^{-4}$ mm. of mercury absolute pressure maintained with a conventional mercury diffusion pump, to a temperature of 800° F., and then to a temperature of 1400° F. at the rate of 100° F. per hour, and maintained at 1400° F. for 24 hours, and cooled. This sample of catalyst beads was reduced and sulfided as follows, to constitute the catalyst designated as Sample B in Table I below.

The A and B catalysts were reduced and sulfided in separate runs in the reactor used for determining "Activity Index" described hereinabove. Specifically, once the catalyst was in the reactor, hydrogen at ambient conditions of temperature and pressure was passed through the unit with the temperature of the hydrogen stream gradually being raised at a rate of 50° F. per hour until a temperature of 560° F. was reached. At this point the system pressure was raised to 1200 p.s.i.g. and maintained at that level for one hour, following which the hydrogen feed was admixed with a hydrocarbon stream comprising mixed hexanes containing 5 wt. percent carbon disulfide, the proportion of hexanes to hydrogen being adjusted so as to give the equivalent of 2 mole percent $H_2S$ in hydrogen. This sulfiding step, at a space rate (LHSV) of 0.22, was continued for three hours at 1200 p.s.i.g. and 560° F., following which the system was depressured to eliminate excess $H_2S$. A pressure of 1200 p.s.i.g. was then reestablished by passing the hydrofined cycle oil test sample described above along with 8000 s.c.f. $H_2$ bbl. feed over the catalyst at a space rate of 2.0. Catalyst temperatures were gradually raised to 610° F., and the Activity Index of the sample determined as described hereinbefore.

The results of the activity determinations are shown in Table I below:

TABLE I

| Sample | Treatment | Area, m.²/g. | 610° F. Activity Index of Sulfided Samples |
|---|---|---|---|
| (A) | 10 hour air calcination at 1000° F. | 371 | 14.0 |
| (B) | 1400° F. vacuum thermactivation. | 354 | 22.5 |

The large increase in catalyst activity despite the small decrease in catalyst microarea following vacuum thermactivation demonstrates the effectiveness of this procedure.

*Example II*

Catalysts were prepared comprising nickel sulfide (2.5% nickel) on two different synthetically prepared silica-alumina cracking supports, one containing 13% alumina and 87% silica and the other 25% alumina and 75% silica, said catalysts each being in the form of ⅛-inch pellets. All steps of the preparations were the same as in Example I except that the initial air calcination was effected at a maximum temperature of 800° F. for 2 hours instead of at 1000° F. for 10 hours, as in said Example I. Activity Index determinations were made on the several samples and the following results obtained.

TABLE II

| Sample Treatment | Support | | | |
|---|---|---|---|---|
| | 87% SiO₂ 13% Al₂O₃ | | 75% SiO₂ 25% Al₂O₃ | |
| | Area, m.²/g. | 610° F. Activity Index | Area, m.²/g. | 610° F. Activity Index |
| (A) 800° F. calcination | 536 | 10.8 | 483 | 7.3 |
| (B) 1400° F. vacuum thermactivation | 421 | 26.7 | 367 | 21.5 |

In the foregoing examples, the efficacy of the described vacuum thermactivation treatment is clearly apparent. When the operations described in said examples are repeated, but with the catalyst being heated for 24 hours at 1400° F. under ambient pressure conditions instead of in vacuo, it is found that the catalyst suffers a significant loss in surface area as compared with that experienced when heating at low pressure. Moreover, the catalysts prepared under ambient pressure conditions have Activity Index values which are several numbers lower than those represented in the examples.

OTHER CATALYST SYSTEMS IN WHICH CATALYST IS OPERABLE

While a hydrocarbon conversion process employing the catalyst of the invention has been described above in connection with fixed catalyst bed operation, such a process may also be carried out using a moving catalyst bed, a fluid catalyst system, or a slurry system, if the catalyst is suitably sized. These general procedures are now well established in the art, and no detailed descriptions will therefore be given for them.

Various minor changes and modifications in the method of preparing the catalyst of this invention can be made without departing from the spirit of said method, and the invention is therefore to be taken only as limited by the scope of the appended claims.

I claim:
1. A method for increasing the hydrocracking activity of a composite catalyst comprising an active siliceous cracking component containing from about 50 to 99% by weight of silica together with a hydrogenating component selected from the group consisting of nickel, nickel oxide, heat decomposable nickel salts, cobalt, cobalt oxide, and heat decomposable cobalt salts, said catalyst having a nickel content of 0.5 to 30% by weight when nickel oxide is present and a cobalt content of from 3 to 30% by weight when cobalt oxide is present, said method comprising heating the catalyst with said hydrogenating component present in the oxide form, at a temperature of from about 1200 to 1600° F. for a period of from about 0.25 to 48 hours under a pressure less than about 1 millimeter of mercury absolute, the lower temperatures having been used generally with the longer times and vice versa.

2. The method of claim 1 wherein there is added the step of reducing the metal oxide hydrogenating component of the catalyst at the conclusion of the catalyst heating treatment.

3. The method of claim 1 wherein there is added the step of at least partially converting the metal oxide hydrogenating component of the catalyst to the corresponding sulfide at the conclusion of the catalyst heating treatment.

4. The method of claim 1 wherein the catalyst is heated under a pressure less than about $10^{-2}$ millimeter of mercury absolute for a time sufficient to provide an increase of at least 4 numbers in the 610° F. Activity Index of the catalyst.

5. A method for increasing the hydrocracking activity of a composite catalyst comprising an active siliceous cracking component containing from about 50 to 99% by weight of silica, together with a hydrogenating component selected from the group consisting of nickel, nickel oxide, heat decomposable nickel salts, cobalt, cobalt oxide, and heat decomposable cobalt salts, said catalyst having a nickel content of 0.5 to 30% by weight when nickel oxide is present and a cobalt content of from 3 to 30% by weight when cobalt oxide is present, said method comprising heating the catalyst when said hydrogenating component is present in the oxide form, under a pressure less than about 1 millimeter of mercury absolute at a temperature of from about 1300 to 1550° F. for a period of from about 0.25 to 48 hours.

6. The method of claim 5 wherein there is added the step of reducing the metal oxide by hydrogenating component of the catalyst at the conclusion of the catalyst heating treatment.

7. The method of claim 5 wherein there is added the step of at least partially converting the metal oxide hydrogenating component of the catalyst to the corresponding sulfide at the conclusion of the catalyst heating treatment.

8. The method of claim 5 wherein the catalyst is heated for a period of time sufficient to provide an increase of at least 4 numbers in the 610° F. Activity Index of the catalyst.

9. A catalyst comprising an active siliceous cracking component containing from about 50 to 99% by weight of silica, together with at least one hydrogenating component selected from the group consisting of cobalt, nickel and the oxides and sulfides of said metals, said catalyst containing from 0.5% to 30% by weight nickel when a nickel-containing material is employed as a hydrogenating component, and from about 3 to 30% by weight cobalt when a cobalt-containing material is so employed, said catalyst having a 610° F. Activity Index of at least 18 as developed therein by heating the catalyst, with the metal of the hydrogenating component being present in the oxide form, at temperatures of from 1200 to 1600° F. under a pressure less than about 1 millimeter of mercury absolute, for a period of from about 0.25 to 48 hours, the lower temperatures having been used generally with the longer times and vice versa.

10. The catalyst of claim 9, wherein said hydrogenating component is nickel sulfide.

11. The catalyst of claim 9, wherein said hydrogenating component is cobalt sulfide.

References Cited

UNITED STATES PATENTS 2,581,228    1/1952    Bailey et al. _____ 252—455
2,780,584    2/1957    Doumani _____ 252—439 X MILTON WEISSMAN, *Primary Examiner.*